Figure 1:
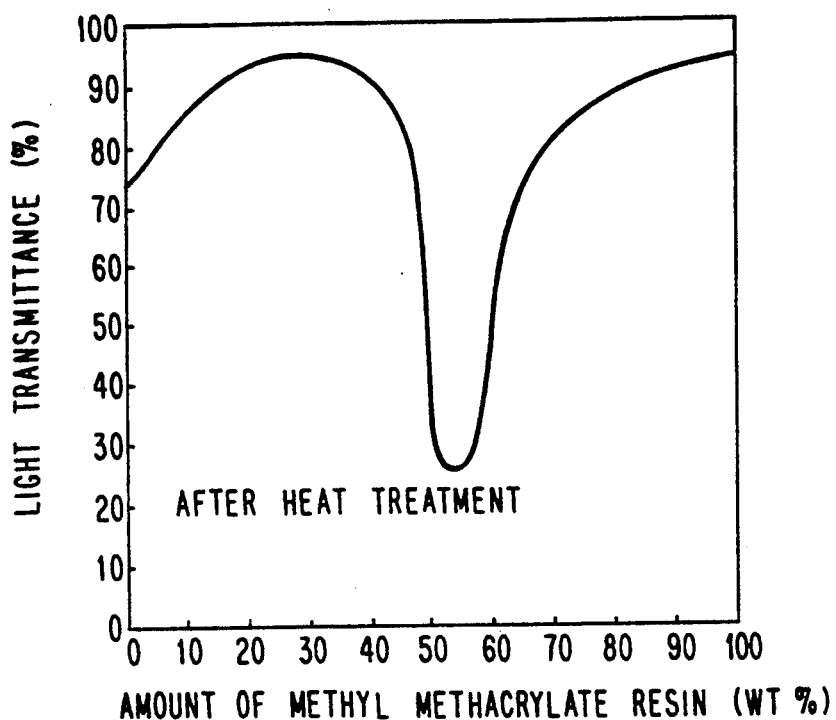

United States Patent [19]

Terasaki et al.

[11] Patent Number: 5,042,924
[45] Date of Patent: Aug. 27, 1991

[54] OPTICAL PHASE PLATE AND PRODUCTION PROCESS THEREOF

[75] Inventors: Shuji Terasaki; Mitsuru Ohta; Akiyasu Ishii, all of Fukushima; Yuji Kojima; Akira Tanaka, both of Kanagawa, all of Japan

[73] Assignees: Kureha Chemical Industry Co., Ltd.; Fujitsu Limited, Japan

[21] Appl. No.: 490,221

[22] Filed: Mar. 8, 1990

[30] Foreign Application Priority Data

Mar. 10, 1989 [JP] Japan .................................. 1-58295

[51] Int. Cl.$^5$ ............................ G02B 1/04; G02B 1/08
[52] U.S. Cl. .................................... 359/500; 252/582; 252/585; 264/1.3; 359/494
[58] Field of Search .......... 350/400, 406, 330, 347 R, 350/96.34; 252/582, 585; 264/1.3

[56] References Cited

U.S. PATENT DOCUMENTS 3,459,834  8/1969  Schmitt .
3,790,645  8/1971  Murayama et al. .
4,863,648  9/1989  Scheinbeim et al. ............... 310/800

OTHER PUBLICATIONS

S. Osaki et al., "Effects of Annealing and Isothermal Crystallization upon Crystalline Forms of Poly(vinylidene Fluoride)", JOURNAL OF POLYMER SCIENCE, Polymer Physics Edition, vol. 13, 1971-1083 (1975).

Bernard R. Hahn et al., "Compensation Method for Zero Birefringence in Oriented Polymers", POLYMER, 1985, vol. 26, Oct., pp. 1619-1622.

*Primary Examiner*—Bruce Y. Arnold
*Assistant Examiner*—Martin Lerner
*Attorney, Agent, or Firm*—Lowe, Price, LeBlanc and Becker

[57] ABSTRACT

An optical phase plate is provided in the form of a drawn and oriented film or sheet, having a composition comprising a vinylidene fluoride resin and a methyl methacrylate resin in a mixing ratio of the former to the latter between about 65/35 and about 85/15 by weight, in which the crystal structure of the vinylidene fluoride resin consists mainly of a β-form and the film or the sheet has dimensional stability and a retardation value R within a range from 500 to 650 nm. The optical phase plate is produced by uniformly kneading and melt-extruding the predetermined PVDF/PMMA mixture into a sheet and subjecting the sheet to drawing and then to heat treatment.

20 Claims, 1 Drawing Sheet

OPTICAL PHASE PLATE AND PRODUCTION PROCESS THEREOF

BACKGROUND OF THE INVENTION

1. Field of the Invention

The present invention concerns an optical phase plate made or plastic sheet of film for use in optical control devices and, more particularly to an optical phase plate which is suitable to provide phase compensation for preventing coloration of screens in black and white liquid crystal display units.

2. Description of the Prior Art

In a transmission type black and white display, incident light is at first linearly polarized upon transmitting there of through a polarization plate, and then enters a liquid crystal cell to be changed into an elliptically polarized light. If the light passes through the polarization plate and is emitted in the form of the elliptically polarized light as it is, since the degree of elliptic polarization is different depending on the wavelength, the intensity of the transmitted light varies and this results in a coloration of the display. Accordingly, for preventing the coloration, phase compensation is necessary for reforming the elliptically polarized light again into linearly polarized light. In view of the above, a phase compensating liquid crystal cell is further laid over the liquid crystal display cell to obtain black and white display, but this involves problems increased weight and cost. The use of a molecularly oriented transparent plastic film as an optical phase plate instead of the phase compensating liquid crystal cell has also been considered.

The optical phase plate means according to this invention comprises a film or sheet-like material having birefringent nature, which causes a phase difference between optical rays orthogonal to each other upon therethrough due to the difference in refractive index in the two directions orthogonal to each other.

For phase compensation, in order to prevent the coloration of black and white liquid crystal display there is required a so-called λ-plate, in which the phase difference between the wavelength of emitted light and the wavelength of incident light equals the wavelength of the incident light. Although application of the λplate to various optical applications has been studied, no satisfactory results have yet been obtained at present. As for the λplates proposed so far, there is known, for example, a uniaxially drawn optically anisotropic film or sheet having birefringence disposed by two or more, such that the main optical axes thereof are orthogonal to each other (Japanese Patent Laid-Open Sho 63-167304), or a single plate with no such stacking (Japanese Patent Laid-Open Sho 63-189804). Further, there is known an optical phase plate prepared by cutting birefringent crystals along a face slanted to the optical axis for compensating scattering of the wavelength of optical source (Japanese Patent Laid-Open Sho 62-218905), that is, an optical phase plate fabricated from birefringent material into a wedge-like shape.

SUMMARY OF THE INVENTION

The object of the present invention is to provide an optical phase plate usable as a λplate, with no requirement for fabrication into a special shape but in the form of a film or sheet of uniform thickness, having high and persistent transparency and a persistent optical phase difference within a range of a retardation value R from 500 to 650 nm.

The phase difference δ of optical rays orthogonal with each other is represented as:

$$\delta = (2\pi/\lambda)(n_e - n_0)d = (2\pi/\lambda)\Delta n \cdot d$$

where d represents the thickness of a phase plate, $n_e$ and $n_0$ represent the refractive indexes for the orthogonal ingredients, λ represents the wavelength of incident light and Δn represents the birefringence, which is expressed as:

$$\Delta n = (n_e - n_0)$$

The retardation value R is represented as: $R = \Delta n \cdot d$ (unit: nm).

Since the phase difference varies if the wavelength of the incident light changes, it is necessary to adjust the optical phase plate depending on the wavelength of the incident light. While the average wavelength of white light is 550 nm, the average wavelength of D sodium rays generally employed frequently is 589 nm. In the case of obtaining a λplate, it is necessary that the retardation value be identical with the wavelength of the incident light, and it is required for the optical phase plate used for liquid crystal display that the retardation value R be within a range from 500 to 650 nm.

Since the thickness d of the optical phase plate used in liquid crystal displays is about 50 to 200 μm, a desired birefringence Δn is determined depending on the retardation value R and d described above.

Taking the use as a λplate into consideration, it is necessary that the birefringence Δn of a plastics material constituting the film or the sheet has a large positive value.

Polycarbonate, polyvinyl alcohol, etc., are known as suitable as molecularly oriented transparent plastics materials.

Vinylidene fluoride resins, typically represented by poly(vinylidene fluoride) (PVDF), are molecularly oriented, and an oriented PVDF film shows a large positive value of the birefringence: $\Delta n = (n\| - n\bot)$ in which $n\bot$ means a refractive index in the orthogonal to the drawing direction and $n\|$ means a refractive index along the drawing direction. PVDF also has excellent properties, such as weather proofness, chemical resistance and dust proofness, etc. However, since PVDF is a crystalline polymer and has insufficient transparency, a film consisting of PVDF has not hitherto been used as the optical phase plate.

On the other hand, methyl methacrylate resins, typically represented by poly(methylmethacrylate) (PMMA), show a negative value for the birefringence Δn, but it is amorphous and excellent in transparency.

Taking notice of this fact, the present inventor has made a study for finding a mixed system of a vinylidene fluoride resin, and a methyl methacrylate resin having transparency and desired birefringence and being otherwise suitable as an optical phase plate.

For the mixed PVDF/PMMA system, it has been reported that a composition containing less than 35% by weight of PVDF has good transparency which is, however, abruptly reduced if the PVDF content is increased to exceed 35% by weight (U.S. Pat. No. 3,459,834, 1969). However, a film or sheet of a composition containing less than 35% by weight of PVDF, even if having the desired transparency, has insufficient birefringence to be used as a λplate because of its low PVDF content.

Further, for the mixed PVDF-PMMA system, it has been reported that the birefringence Δn varies depending on the PVDF/PMMA mixing ratio, drawing ratio and drawing temperature in a composition containing 14 to 60% by weight of PVDF (Bernd R. Hahn and Joachim H. Wendorff, "POLYMER", Vol. 26; pp 1619–1622 (1985)). However, details are not reported in this literature for a composition containing more than 60% by weight of PVDF, and since it has usually been considered that the transparency is reduced as the ratio of PVDF in the composition is higher, use of a composition having higher PVDF content for an application requiring transparency can not be anticipated from the literature. In addition, no consideration has been taken for the application involving its use as the λplate. Further, it is not apparent whether the retardation value can be maintained without change over a lapse of time. According to the study of the present inventor, it has been found that the retardation can not be maintained at an initial value, and also that the transparency is lowered with lapse of time depending on the composition in a film or sheet prepared by merely molding and drawing a composition of a mixed PVDF/PMMA system. Accordingly, no optical phase plate usable as a λplate can be anticipated from the literature.

The present invention has been accomplished for finding a film or a sheet of a mixed PVDF/PMMA system capable of maintaining transparency for a long period of time and a retardation value R within a range from 500 to 650 nm and providing an optical phase plate usable as a λplate.

SUMMARY OF THE INVENTION

The foregoing principal object can be attained by an optical phase plate according to the present invention, by providing an oriented film or sheet having a composition comprising a vinylidene fluoride resin and a methyl methacrylate resin in a mixing ratio of the former to the latter between about 65/35 and about 85/15 by weight, in which the crystal structure of the vinylidene fluoride resin consists of a β-phase and the film or the sheet has a dimensional stability and a retardation value R within a range from 500 (inclusive) to 650 (inclusive) nm.

The vinylidene fluoride resin mainly consisting of the β-form means that the volume fraction of crystal form of the β-form is more than 50% and and the volume fraction of crystal form of the α-form is less than 50% in the vinylidene fluoride resin as measured by IR absorption spectroscopy. The volume fraction of crystal form of the β-form is, preferably, more than 60%; and, more preferably, more than 70%, in particular, more than 80% in the vinylidene fluoride resin.

The volume fraction of crystalline form of the β-form in the vinylidene fluoride resin is measured by IR asbsorption spectroscopy and then calculated as shown below based on the method of S. Osaki, et. al. (method described in Journal of Polymer Science, Vol. 13, 1071–1083 (1975)), which disclosure is hereby incorporated by reference. That is, a peak for the α-form crystals is present at a wave number of 530 cm$^{-1}$ and a peak for the β-form crystals is present at a wave number of 510 cm$^{-1}$ of IR absorption spectroscopy. Based on the absorption at the position for each of the peaks, the absorbance for the α-form is expressed as:

$$D_{530} = \log_{10}(I_0/I)_{530}$$

and the absorbance for the β-form is expressed as:

$$D_{510} = \log_{10}(I_0/I)_{510}$$

The volume fraction of crystalline form of the β-form in the vinylidene fluoride resin can be calculated by the following equation:

$$\text{Volume fraction of crystal form of } \beta\text{-form in the vinylidene fluoride resin} = \frac{D_{510}}{0.81 D_{530} + D_{510}} \times 100 \, (\%)$$

The optical phase plate according to the present invention described above can be prepared as below. That is, a process for producing an optical phase plate according to the present invention comprises uniformly kneading a composition comprising a vinylidene fluoride resin and a methyl methacrylate resin in a mixing ratio of the former to the latter between about 65/35 and about 85/15 by weight, molding the kneaded product by means of melt-extrusion into a film or sheet followed by quenching so that the crystal structure of the vinylidene fluoride resin in the film or the sheet mainly consists of a β-form, thereafter, drawing the film or the sheet at a temperature from 25° to 150° C. and then applying heat treatment at a temperature of 50° to 160° C. after the drawing.

DESCRIPTION OF THE ACCOMPANYING DRAWINGS

Figure 2:
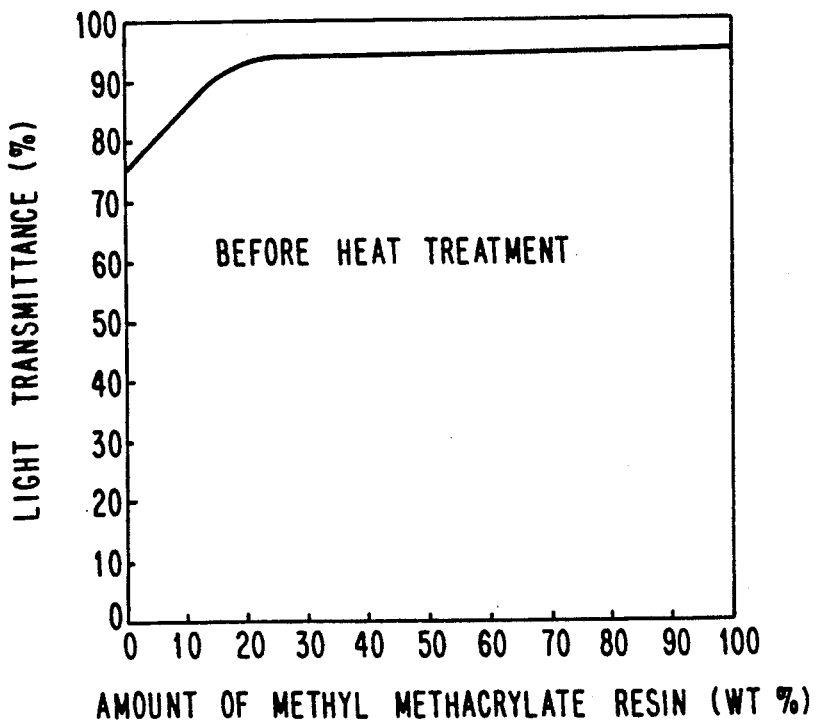

FIG. 1 is a graph illustrating a relationship of the light transmittance to the weight percentage of a methyl methacrylate resin for sheets of 150 μm thickness, each prepared by uniformly kneading vinylidene fluoride resin and a methyl methacrylate resin in various mixing ratios, melt molding into a sheet, applying drawing and, thereafter, heat treatment at 100° C. for 10 min; and FIG. 2 is a graph illustrating a relationship of the light transmittance relative to the weight percentage of the methyl methacrylate resin for the sheet shown in FIG. 1 before of the heat treatment thereof.

As for the vinylidene fluoride resin used in the present invention, there can be mentioned not only a vinylidene fluoride homopolymer, i.e., PVDF, but also a copolymer containing not less than 50 mol % of vinylidene fluoride, or a polymer blend comprising two or more of such polymers. Suitable monomers copolymerizable with vinylidene fluoride can include, for example, tetrafluoroethylene, hexafluoropropylene, trifluoroethylene, trifluorochloroethylene and vinyl fluoride.

Further, as for the methyl methacrylate resin, there can be mentioned not only a methyl methacrylate homopolymer, but also a copolymer of not less than 70 mol % of a methyl methacrylate and not more than 30 mol % of acrylic acid ester or methacrylic acid ester other than methyl methacrylate, or a polymer blend comprising two or more of such polymers. Further, suitable acrylic acid esters for the copolymer include, for example, methyl acrylate, ethyl acrylate or propyl acrylate, and suitable methacrylic acid ester other than methyl methacrylate e.g., ethyl methacrylate or propyl methacrylate. In addition, a small amount of a third ingredient may also be included.

In a film or sheet of the mixed vinylidene fluoride resin/methyl methacrylate resin system, the birefringence Δn varies, depending on the mixing ratio of the vinylidene fluoride, resin/methyl methacrylate resin and the drawing ratio. As the amount of the vinylidene fluoride resin having greater birefringence as compared with the methyl methacrylate resin is increased in the mixing ratio of the vinylidene fluoride resin/methyl methacrylate resin, the birefringence Δn of the mixed system can be greater. For setting the retardation value R within a range from 500 to 650 nm, it is desirable that the mixing ratio of the vinylidene fluoride resin be as high as possible. Further, the vinylidene fluoride resin is, desirably, mixed at a selected ratio as much as possible so that the retardation value R set at a value within a range from 500 to 650 nm is stably maintained at that value.

Referring to the transparency, it has been found that a film or sheet prepared by uniformly kneading the vinylidene fluoride resin and the methyl methacrylate resin described above in various mixing ratios, melt-molding the same into a film or sheet followed by quenching, applying drawing at 90° C. and then applying a heat treatment, has a light transmittance as shown in FIG. 1. As shown in FIG. 1, between a composition containing 100% by weight of a methyl methacrylate resin, that is, containing 0% by weight of a vinylidene fluoride resin and a composition containing 50% by weight of a methyl methacrylate resin, the more amount of the vinylidene fluoride resin is increased, the less light transmittance there is, and the light transmittance takes a minimum value in the vicinity of 50% by weight of the vinylidene fluoride resin. However the transmittance increases again when the content of the vinylidene fluoride resin exceeds 50% by weight and takes the maximum value in the vicinity of 70% by weight of the vinylidene fluoride resin. It is to be noted in FIG. 1 that the sheet, within a range of the vinylidene fluoride resin from 58 to 85% by weight, has an extremely high light transmittance although heat treatment is applied after the drawing.

According to experiments performed by the inventor, the sheet before undergoing the heat treatment after the drawing has a light transmittance as shown in FIG. 2. That is, the sheet shows no minimum value in the vicinity of 50% by weight of the vinylidene fluoride resin but shows a high light transmittance up to the vicinity of 80% by weight of the vinylidene fluoride resin as comparable with that of the sheet comprising 100% by weight of the methyl methacrylate resin. Accordingly, it seems that the heat treatment is not preferred, if only in view of the transparency, because it is generally considered for vinylidene fluoride resin blend systems that the heat treatment promotes the crystallization and reduces the transparency of the vinylidene fluoride resin. However, crystallization proceeds also in the sheet not applied with heat treatment by aging changes, for example, by being left at room temperature about from one to several months, and the light transmittance changes become similar to that shown in FIG. 1. In the case of using the sheet at a temperature higher than room temperature, this is further accelerated.

It has been found that a sheet, which is prepared by uniformly kneading a vinylidene fluoride resin and a methyl methacrylate resin, molding the same followed by quenching so that the crystal structure of the vinylidene fluoride resin mainly consists of the β-form in the sheet and then drawing the sheet at a temperature of 25° to 150° C., has such a region as not hindering the transparency within the range of the composition ratio of the vinylidene fluoride resin from 58 to 85% by weight. Hence, so long as a sheet of composition within the above-mentioned range is used, heat treatment has no significance in terms of the transparency.

Incidentally it has been found by the present inventor that heat treatment after the drawing has an effect of increasing the retardation value and also of maintaining the value constant when the range of the composition ratio of the vinylidene fluoride resin is from about 65 to about 85% by weight as described later. Therefore, in the production process according to the present invention, it has been possible to obtain a film or sheet suitable for an application use as a λplate capable of satisfying both of the conditions of the retardation value and the transparency, by adopting the heat treatment after the drawing as an essential step and applying heat treatment to the sheet wherein the composition ratio of the vinylidene fluoride resin is from about 65 to about 85% by weight.

Referring first to the condition of the transparency, it can be seen from FIG. 1 that a mixing ratio between the vinylidene fluoride resin/methyl methacrylate resin of between 58/42 and 85/15, preferably at about 70:30 is required for obtaining a film or sheet of excellent transparency having light transmittance of higher than 90%.

The reason why transparency showing light transmittance higher than 90% within the above-mentioned range of the composition can be expected is provided below.

It is known that methyl methacrylate resin is amorphous and has excellent transparency, whereas vinylidene fluoride resin contains crystallites of β-form forming no spherulites and spherulites of α-form with the crystal grain sizes as large as from several to several tens of micron meters, and that growth of the α-form crystals hinders the transparency. In the case of the composition range described above, since the vinylidene fluoride resin and the methyl methacrylate resin are sufficiently kneaded uniformly, formation of the α-form crystals of the vinylidene fluoride resin is hindered by the methyl methacrylate resin. That is, the above-mentioned region is considered to be a specific region in which β-form crystals are stabilized. In this region, although the α-form crystals are not completely absent, the volume fraction of the volume α-form crystals is small, i.e., less than 50% in the vinylidene fluoride resin, so long as observed by IR absorption spectroscopy.

That is, a film or sheet of high light transmittance can be obtained within a composition range in which the crystal structure of the vinylidene fluoride resin mainly consists of β-form crystals and a sheet of desired birefringence can be obtained since the mixing ratio of the vinylidene fluoride resin is high in this composition range.

In the foregoing explanation, transparency has been described regarding light transmittance giving an effect on the brightness of the display screen. With regard to a haze value, which relates to an effect on the clearness of the display screen, the optical phase plate according to the present invention has a haze value as low as or less than 2% and can provide clear images.

As has been described above, the birefringence Δn is increased along with the increase of the vinylidene fluoride resin in the composition of the mixed system. However, if the molded film or the sheet is not oriented, the value of the birefringence Δn is still insufficient for obtaining the retardation value within a range from 500 to 650 nm. Thus, it is necessary to increase Δn by applying drawing to the molded film or the sheet, thereby increasing the degree of crystal orientation. However, no matter how much the drawing ratio is increased so as to obtain a birefringence for providing a desired retardation value R, it will be practically useless if the value significantly changes with the passage of time. According to the finding of the present invention, even when the heat treatment is applied after drawing to provide a dimensional stability, if the composition ratio between the vinylidene fluoride resin and the methyl methacrylate resin is for example, 50:50 or 60:40, respectively 15% or 5% changes of the retardation value are recognized after 50 hours at 70° C.

The present inventor has accomplished the present invention based on the finding that the retardation value becomes more stable by a heat treatment after the drawing as the amount of the vinylidene fluoride resin is greater, that the retardation value is maintained substantially constant when the mixing ratio of the vinylidene fluoride resin to the methyl methacrylate resin is not less than 65/35 by weight, and that a transparency of higher than 90% can also be satisfied in the constitution according to the present invention.

The preferable mixing ratio of the vinylidene fluoride resin to the methyl methacrylate resin is within about 70/30 and about 80/20.

In the present invention, the dimensional stability is defined to require a shrinkage in the drawing direction to be less than 2%, when the film or sheet is placed at 40° C. 24 hours after the drawing and heat treatment of the film or the sheet. According to related experiments, while the shrinkage is as high as greater than 10% in a case of not applying the heat treatment, it is less than 2% when the heat treatment is applied.

The temperature of the heat treatment for providing such a dimensional stability is between 50° C. and 160° C. and, preferably, between 70° C. and 145° C. At a temperature lower than 50° C., the retardation value measured by a polarizing microscope may possibly be changed with passage of time. On the other hand, heating at a temperature higher than 160° C. results in an operational problem since the film or the sheet is softened and the retardation value is not further improved if the film or sheet is heated to a higher temperature. It is desired that the temperature of the heat treatment be higher than the operational temperature of the optical phase plate. After the heat treatment is applied at a certain temperature, the retardation shows no changes but remains at a substantially constant value at a temperature lower than that within the constitution range according to the present invention.

The reason why the retardation value is increased by the heat treatment is believed to be attributable to the increase of the birefringence based on the increase in the degree of crystallization of the vinylidene fluoride resin and the degree of molecular orientation in the amorphous portion of the vinylidene fluoride resin.

Since the birefringence is increased by the heat treatment even if the drawing ratio is small, a desired retardation value can be obtained even for a thin film or sheet with a thickness of less than 100 μm according to the present invention.

In the production process for the optical phase plate according to the present invention, a composition comprising a vinylidene fluoride resin and a methyl methacrylate resin, in a mixing ratio of the former to the latter between about 65/35 and about 85/15 by weight and preferably about 70/30 to about 80/20, is uniformly mixed and kneaded. The term "uniformly" means that the mixture is kneaded sufficiently so that the volume fraction of crystal form in the vinylidene fluoride resin in a film or sheet mainly consists of the β-form when the film or sheet is molded by melt extrusion followed by quenching, as measured by IR absorption spectroscopy. Note that the α-form is formed if the degree of kneading is low, whereas β-form is formed as the degree of kneading is higher.

Specifically, the resins are mixed uniformly by a generally known method, for example, a method of uniformly mixing both of the resins in a Henschel mixer or V-blender, etc., and melt-kneading by means of a single axis or twin-axes extruder, etc., after the mixing, while properly designating the L/D of an extruder, a compression rate, a screw considering the kneading property, etc., so that the resin composition may be kneaded sufficiently and thereby preparing pellets of the mixture as starting pellets, or a method of post-polymerization of the methyl methacrylate monomer with the vinylidene fluoride resin.

Post-polymerization of methyl methacrylate with the vinylidene fluoride resin is disclosed in U.S. Pat. No. 3,790,645 issued Feb. 5, 1974 to Naohiro Murayama, et. al., which disclosure is hereby incorporated by reference.

The product obtained by the above-mentioned method is then melt-molded into a film or sheet by using a calender roller, a conventional T-die method (extrusion method using a T-die), an inflation method (extrusion method using a ring die) or an extruder capable of sufficient kneading.

The film or the sheet is quenched after the molding by melt extrusion. The quenching is applied to such an extent that the crystal structure of the vinylidene fluoride resin in the film or sheet before drawing consists mainly of the β-form. The volume fraction of the β-form is preferably more than 60% and, more preferably, more than 70%. This is done not by allowing the product to stand at room temperature but by forcibly applying abrupt cooling. Specifically, this requires bringing at least one of the surfaces of the film or the sheet in contact with a liquid or solid coolant at a temperature lower than 80° C., preferably, lower than 40° C. and, more preferably, lower than 25° C., thereby cooling the same. Since the central portion of the film or the sheet is relatively less quenched as the thickness is increased, the temperature of the coolant has to be lowered in this case. In addition, as the mixing ratio of the vinylidene fluoride resin is greater, the quenching should be conducted at a lower temperature. While water cooling is usually sufficient for the quenching, quenching by using a coolant at a temperature lower than 10° C. is desirable.

Thus obtained un-oriented film or sheet is then drawn by means of a known roller or tenter type of drawing machine. The temperature upon drawing is set between 25° C. and 150° C., because nonuniform orientation are liable to occur if it is lower than 25° C. during drawing and, on the contrary, the drawing becomes difficult if it exceeds 150° C., since it approaches the molten state. The temperature is preferably from 60° to 140° C. and, more preferably, from 80° to 130° C. If the temperature goes lower than at 80° C., particularly, lower than 60° C., the retardation somewhat lacks in stability, whereas the degree of orientation can not be increased easily because it leads to difficulty in fabrication if it exceeds 130° C. and, in particular, 140° C.

Drawing is done for a film or sheet in which the vinylidene fluoride resin is in molten or unmolten state but, preferably, in an unmolten state.

Drawing is applied by uniaxial or biaxial drawing. The drawing ratio is determined such that the retardation value is within a range from 500 to 650 nm in view of the retardation being a product of the birefringence due to the orientation degree of the film or the sheet and a thickness of the sheet. In the case of uniaxial drawing, the drawing ratio is from 1 to 3 along the drawing direction, preferably, from 1.05 to 2.0, more preferably, from 1.1 to 1.5. In the case of the biaxial drawing, it is controlled such that a product of the drawing ratio in the longitudinal direction and the drawing ratio in the transverse direction is from 1.3 to 9.5, preferably, from 1.5 to 6.0.

The heat treatment after the drawing is applied under tension, preferably, at least at the final stage of the heat treatment. Further, the film or the sheet is, preferably, also maintained under tension in the cooling stage after the heat treatment. This is done for preventing deformation and to keep the shape of the film or the sheet constant. The initial stage of the heat treatment, is carried out with or without applying a tension to the film or the sheet.

The temperature for the heat treatment is from 50° to 160° C. and, preferably, from 70° C. to 145° C. as described above, while the time of heat treatment is set to more than one sec. desirably, more than 3 sec. and, further desirably, more than 10 sec. A longer time is required as the temperature is lower within the above-mentioned temperature range, or as more stress is applied at an identical temperature. However, heating for more than one hour usually causes no further beneficial effect. A sufficient effect can be usually obtained by the heating within 30 min at a temperature lower than 100° C., within 10 min at a temperature from 100° C. to 120° C., and within 5 min at a temperature higher than 120° C. Annealing may be applied, if necessary, after the heat treatment.

In the production process for the optical phase plate according to the present invention, snce uniformly kneaded vinylidene fluoride resin and methyl methacrylate resin at a specific mixing ratio of the former to the latter between about 65/35 and about 85/15 is melt-molded, drawn and then further applied with heat treatment, a film or sheet having a dimensional stability and capable of maintaining a predetermined or specific retardation value within a range from 500 to 650 nm can be obtained. In the composition of the specific mixing ratio described above, since growth of α-form crystals of the vinylidene fluoride resin is inhibited and β-form is mainly maintained stably by the effect of uniform kneading the composition and quenching, transparency of the film of the sheet is not lowered by the heat treatment after drawing and a light transmittance higher than 90% is maintained.

Examples and comparative examples are shown below. In each of the examples and comparative examples, the retardation value R was calculated from a product of the birefringence measured under D sodium rays (average wavelength at 589 nm) by using a polarized microscope, adapted with a Berek compensator manufactured by Olympus Optical Industry Co. and the thickness of the sheet. Further, the light transmittance and the haze value were measured according to JIS-K7105 by using Model ITC-H3 type manufactured by Tokyo Denshoku Co.

EXAMPLE 1

Poly(vinylidene fluoride) (KF polymer #1100, trade name of products manufactured by Kureha Chemical Industry Co.) and methyl methacrylate resin (substantially, poly(methylmethacrylate): Parapet HR-1000, trade name of products manufactured by Kyowa Gas Chemical Co.) were formulated in 80/20 percent by weight, mixed for 10 min using a V-blender, and melt-kneaded in a single axis extruder to be once formed into mixed pellets. Then, the pellets were extruded by using a T-die into a sheet and quenched by passing through a cooling roll in which water was circulated, to prepare a non-oriented sheet of 170 μm thickness. The volume fraction of crystal form of the β-form in PVDF in the non-oriented sheet was 70% and the retardation value was 220 nm. Subsequently, as a result of applying a uniaxial drawing at 90° C. by a ratio of 1.3, a sheet with a thickness of 130 μm and having a retardation value of 410 nm was formed. Then, when the sheet was further subjected to a heat treatment under tension within a range from 80° C. to 100° C. for 45 min, the retardation value had a specific value within a range from 500 to 650 nm for each heat treating temperature, to obtain a sheet usable as a λplate. Each of the sheets had light transmittance of higher than 94% and the haze value of not more than 0.3%, thus showed extremely high transparency. The results of the measurement are as shown in Table 1.

Further, the volume fractions of crystal form of β-form in the PVDF in these sheets were within a range of 75 to 85%.

As each of the sheets had a shrinkage of less than 1.5% after 24 hours at 40° C., they also had dimensional stability. Further, the sheets were placed in an electric oven at uniform temperature for measuring the retardation value, the light transmittance and the haze value after 50 hours at 70° C., and there were no substantial changes at all.

EXAMPLE 2

When a non-oriented sheet of 160 μm thickness was prepared in the same manner as in Example 1 and then drawn at 90° C. by a factor of 1.15 under uniaxial drawing condition, the thickness of the sheet after drawing was 140 μm, and the volume fraction of crystal form of the β-form in PVDF was 72% and the retardation value was 345 nm. When the sheet was subject to a heat treatment under tension in the same manner as in Example 1 within a range from 110° C. to 130° C. for 10 min, the retardation value was within a range from 500 to 650 nm for each heat treating temperature, to provide sheets usable as λ-plate. Each of the sheets had a light transmittance of higher than 94% and a haze value of not more than 0.3%. The these measurements are as shown in Table 1.

Further, the volume fraction of crystal form of the β-form in PVDF in these sheets was within a range from 75 to 85%.

As each of the sheets had a shrinkage of lower than 1.5% after 24 hours at 40° C., they also dimensional stability. Further, the sheets were placed in an electric oven at uniform temperature and, for measuring the retardation value, the light transmittance and the haze value after 50 hours at 70° C., and there were no substantial changes at all.

EXAMPLE 3

A non-oriented sheet of 174 μm thickness was prepared in the same manner as in Example 1 except for changing the percent by weight of the poly(vinylidene fluoride) and the methyl methacrylate resin to 70/30. The volume fraction of crystal form of the β-form in PVDF in the non-oriented sheet was 78% and the retardation value was 190 nm. As a result of applying uniaxial drawing by a ratio of 1.15 at 80° C. to the non-oriented sheet, the thickness was reduced to 150 μm and the retardation value was increased to 417 nm. When the drawn sheet was subjected to a heat treatment under tension for 45 min at a temperature within a range from 80° C. to 100° C., sheets usable as the λplate each having a retardation value at a specific value within a range from 500 to 650 for each heating temperature were obtained. Each sheet had a light transmittance of higher than 94% and a haze value of less than 0.3%. The results of measurement are as shown in Table 1.

Further, the volume fraction of crystal form of β-form in PVDF in each of the sheets was within a range from 80 to 95%.

As each of the sheets had a shrinkage of less than 1.5% after 24 hours at 40° C., it has a dimensional stability.

Further, when the sheets were placed in an electric oven at uniform temperature, for measuring the retardation value, the light transmittance and the haze value after 50 hours at 70° C., the variation coefficient of the retardation value was maintained at 1.5 to 2.5% and there were no substantial changes in the other values.

EXAMPLE 4

A non-oriented sheet of 130 μm thickness was prepared in the same manner as in Example 1 except for changing the percent by weight of the poly(vinylidene fluoride) and the methyl methacrylate resin to 65/35. The volume fraction of crystal form of the β-form in PVDF in the non-oriented sheet was 76% and the retardation value was 160 nm. As a result of applying uniaxial drawing by a factor of 1.3 at 75° C., the thickness was reduced to 100 μm and the retardation value was increased to 345 nm. When the drawn sheet was subjected to a heat treatment under tension for 10 min at a temperature within a range from 80° C. to 120° C., a sheet usable as the λplate having a retardation value at a specific value within a range from 500 to 600 nm for each heating temperature was obtained. Each of the sheets had a light transmittance of higher than 94% and a haze value of not more than 0.4%. The results of these measurements are as shown in Table 1.

Further, the volume fraction of crystal form of the β-form in PVDF in each of the sheets was within a range from 80 to 95%.

As each of the sheets had a shrinkage of less than 1.5% after 24 hours at 40° C., they also had dimensional stability. Further, the sheets were placed in an electric oven at uniform temperature and, for measuring the retardation value, the light transmittance and the haze value after 50 hours at 70° C., the variation coefficient of the retardation value was maintained at 2.0 to 3.0% and there were no substantial changes in the other values.

COMPARATIVE EXAMPLE 1

A non-oriented sheet of 150 μm thickness was prepared in the same manner as in Example 1 except for changing the percent by weight of the poly(vinylidene fluoride) and the methyl methacrylate resin to 90/10. The volume fraction of crystal form of the β-form in PVDF in the non-oriented sheet was 28% and the retardation value was 290 nm. As a result of applying uniaxial drawing by a ratio of 1.10 at 110° C., the thickness was reduced to 140 μm and the retardation value was increased to 480 nm. When the oriented sheet was subjected to a heat treatment under tension for 45 min at 145° C., a sheet having a retardation value of 590 nm was obtained. Further, in measuring the retardation value, optical transmittance and haze value of the sheet after 50 hours at 70° C., no substantial were noted. However, the sheet had a light transmittance as low as 85% and, in addition the haze value was extremely high at 3.5% and the sheet therefore could not be used as an optical phase plate for preventing the coloration of the screen of liquid crystal display. The characteristic values of this sheet are as shown in Table 1.

The volume fraction of crystal form of the β-form in PVDF in each of the sheets was less than 60%.

COMPARATIVE EXAMPLE 2

A non-oriented sheet of 130 μm thickness was prepared in the same manner as in Example 1 except for changing the percent by weight of the poly(vinylidene fluoride) and the methyl methacrylate resin to 60/40. The volume fraction of crystal form of the β-form in PVDF in the non-oriented sheet was 76% and the retardation value was 140 nm. As a result of applying uniaxial drawing by a ratio of 1.3 at 75° C., the thickness was reduced to 100 μm and the retardation value was increased to 300 nm. When the drawn sheet was subjected to a heat treatment under tension for 10 min at 120° C., a sheet having a retardation value of 480 nm was obtained. The sheet has a light transmittance of 93% and a haze value of 0.7%. The characteristic values of the sheet are shown in Table 1.

Further, the volume fraction of crystal form of β-form in PVDF in this sheet was 80%.

As the sheet has a shrinkage of lower than 1.5% after 24 hours at 40° C., it has a dimensional stability. Further, when the sheet was placed in an electric oven at uniform temperature for measuring the retardation value, the light transmittance and the haze value after 50 hours at 70° C., the variation coefficient of the retardation value was as high as 5%.

COMPARATIVE EXAMPLE 3

A non-oriented sheet of 200 μm thickness was prepared in the same manner as in Example 1 except for changing the percent by weight of the poly(vinylidene fluoride) and the methyl methacrylate resin to 50/50. The volume fraction of crystal form of the β-form in PVDF in the non-oriented sheet was 78% and the retardation value was 70 nm. As a result of applying uniaxial drawing by a ratio of 2 at 50° C., the thickness was reduced to 100 μm and the retardation value was increased to 240 nm. When the oriented sheet was subjected to a heat treatment under tension for 45 min at 130° C., a sheet having a retardation value of 650 nm was obtained. However, the sheet had a light transmittance as low as 30% and the retardation value of the sheet after 50 hours at 70° C. was increased to 750 nm, showing about 15% increase. Moreover, the sheet had a shrinkage of 3.5% after 24 hours at 40° C. and could not be used as an optical phase plate for preventing the coloration of the screen of a liquid crystal display. Characteristic values of the sheets are as shown in Table 1.

Further, the volume fraction of crystal form of the β-form in PVDF in these sheets was 83% for those not subjected to a heat treatment after drawing and 45% for those applied with heat treatment, showing that the β-form was not stabilized.

EXAMPLE 5

A non-oriented sheet of 170 μm thickness was prepared in the same manner as in Example 1 except for changing the percent by weight of the poly(vinylidene fluoride) and the methyl methacrylate resin to 85/15. The volume fraction of crystal form of the β-form in PVDF in the non-oriented sheet was 65%. As a result of applying uniaxial drawing by a ratio of 1.2 at 100° C., the thickness was reduced to 140 μm and the retardation value was increased to 360 nm, the high transmittance was 90% and the haze value was 1.0%. When the oriented sheet was subjected to a heat treatment under tension for 10 min at a temperature of 100° C., the volume fraction of crystal form of the β-form in PVDF was 76% and the retardation value was 520 nm. The characteristic values of the sheet are as shown in Table 1.

As the sheet had a shrinkage of 1% after 24 hours at 40° C., it has dimensional stability as defined in the present invention. Further, when the sheet was placed in am electric oven at uniform temperature for measuring the retardation value, the light transmittance and the haze value, there were no substantial changes in comparison with the initial values.

EXAMPLE 6

A non-oriented sheet of 200 μm thickness with the identical composition as in Example 1 was prepared. The volume fraction of crystal form of the β-form in PVDF in the sheet was 80% and the retardation value was 80 nm. The sheet was uniaxially oriented at 80° C. in the longitudinal direction by a ratio of 1.3 and then drawn at 90° C. in the transverse direction by a ratio of 1.5 to obtain a biaxially drawn sheet of about 100 μm thickness. The biaxially drawn sheet was relaxed for about 3% in a transverse direction and heat treated at 100° C. for 10 min after the completion of the drawing. The sheet after the heat treatment had a thickness of 105 μm, a retardation value R of 590 nm, light transmittance of 94% and a shrinkage after 24 hours at 40° C. of less than 1%. The volume fraction of crystal form of the β-form in PVDF was more than 80%.

TABLE 1

| Example No. | PVDF/PMMA mixing ratio | Drawing ratio | Thickness (μm) | Heat treatment (°C.) | R (nm) | Light transmittance (%) | Haze (%) |
|---|---|---|---|---|---|---|---|
| 1 | 80/20 | 1.3 × | 130 | Before heat treatment | 410 | 94.4 | 0.2 |
| " | " | " | " | 80° C. 45 min | 530 | 94.4 | 0.2 |
| " | " | " | " | 90° C. 45 min | 580 | 94.4 | 0.2 |
| " | " | " | " | 100° C. 45 min | 650 | 94.3 | 0.3 |
| 2 | 80/20 | 1.15 × | 140 | Before heat treatment | 345 | 94.3 | 0.3 |
| " | " | " | " | 110° C. 10 min | 510 | 94.3 | 0.3 |
| " | " | " | " | 120° C. 10 min | 570 | 94.3 | 0.3 |
| " | " | " | " | 130° C. 10 min | 650 | 94.3 | 0.3 |
| 3 | 70/30 | 1.15 × | 150 | Before heat treatment | 417 | 94.4 | 0.2 |
| " | " | " | " | 80° C. 45 min | 515 | 94.4 | 0.2 |
| " | " | " | " | 90° C. 45 min | 560 | 94.4 | 0.2 |
| " | " | " | " | 100° C. 45 min | 620 | 94.3 | 0.3 |
| 4 | 65/35 | 1.3 × | 100 | Before heat treatment | 345 | 94.2 | 0.3 |
| " | " | " | " | 80° C. 10 min | 500 | 94.2 | 0.3 |
| " | " | " | " | 100° C. 10 min | 540 | 94.2 | 0.3 |
| " | " | " | " | 120° C. 10 min | 600 | 94.0 | 0.4 |
| 5 | 85/15 | 1.2 × | 140 | Before heat treatment | 360 | 90.0 | 1.0 |
| " | " | " | " | 100° C. 10 min | 520 | 90.0 | 1.5 |
| Comparative Example No. | | | | | | | |
| 1 | 90/10 | 1.1 × | 140 | Before heat treatment | 480 | 85.0 | 2.7 |
| " | " | " | " | 145° C. 45 min | 590 | 85.0 | 3.5 |
| 2 | 60/40 | 1.3 × | 100 | Before heat treatment | 300 | 93.5 | 0.5 |
| " | " | " | " | 120° C. 10 min | 480 | 93.0 | 0.7 |
| 3 | 50/50 | 2 × | 100 | Before heat treatment | 240 | 94.0 | 0.3 |
| " | " | " | " | 130° C. 45 min | 650 | 30.5 | 40.0 |

According to the present invention, since it is possible to obtain an optical phase plate in the form of a film or sheet of uniform thickness, having a persistent light transmittance of not lower than 90%, dimensional stability, and a retardation value R maintained substantially constant within a range from 500 to 650 nm, the plate can be used as a phase compensating λplate for preventing a coloration in black and white liquid crystal display and this can reduce the weight and the cost of the device as compared with the conventional phase compensation using a liquid crystal cell.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An optical phase plate in the form of an oriented film or sheet having a composition comprising a vinylidene fluoride resin and a methyl methacrylate resin, wherein:
   a mixing ratio of the vinylidene fluoride resin to the methyl methacrylate resin is between about 65/35 and about 85/15 by weight,
   the crystal structure of the vinylidene fluoride resin mainly consists of a β-form and
   the film or the sheet has dimensional stability and a retardation value R within a range from 500 to 650 nm.

2. An optical phase plate as claimed in claim 1, wherein:
   the volume fraction of a crystal form of said β-form in said vinylidene fluoride resin is more than 60%.

3. An optical phase plate as claimed in claim 1, wherein:
   the volume fraction of a crystal form of said β-form in said vinylidene fluoride resin is more than 70%.

4. An optical phase plate as claimed in claim 1, wherein:
   the volume fraction of a crystal form of said β-form in said vinylidene fluoride resin is more than 80%.

5. An optical phase plate as claimed in claim 1, wherein:
   said mixing ratio of the vinylidene fluoride resin to the methyl methacrylate resin is between about 70/30 and about 80/20.

6. A process for producing an optical phase plate, comprising the steps of:
   uniformly kneading a composition comprising a vinylidene fluoride resin and a methyl methacrylate resin in a mixing ratio of the former to the latter between about 65/35 and about 85/15 by weight;
   molding the kneaded composition into a film or sheet by melt extrusion followed by quenching, so that the crystal structure of the vinylidene fluoride resin in said film or sheet mainly consists of a β-form;
   drawing said film or sheet at a temperature from 25° C. to 150° C.; and
   applying heat treatment to the drawn film or sheet at a temperature in the range 50° C. to 160° C. after said drawing.

7. A process for producing an optical phase plate as claimed in claim 6, wherein:
   the volume fraction of a crystal form of said β-form in said vinylidene fluoride resin is more than 60%.

8. A process for producing an optical phase plate as claimed in claim 6, wherein:
   the volume fraction of a crystal form of said β-form in said vinylidene fluoride resin is more than 70%.

9. A process for producing an optical phase plate as claimed in claim 6, wherein:
   said mixing ratio of the vinylidene fluoride resin to the methyl methacrylate resin is between about 70/30 and about 80/20.

10. A process for producing an optical phase plate as claimed in claim 6, wherein:
    said drawing is done on the film or sheet while the vinylidene fluoride resin therein is in an unmolten state.

11. In an optical control device, a phase compensation means comprising:
    an optical phase plate comprising an oriented film or sheet having a composition comprising a vinylidene fluoride resin and a methyl methacrylate resin, in a mixing ratio of the former to the latter between about 65/35 and about 85/15 by weight, wherein
    a crystal structure of the vinylidene fluoride resin mainly consists of a β-form thereof and the film or sheet has dimensional stability and a retardation value R within a range from 500 to 650 nm.

12. An optical control device according to claim 11, wherein:
    the volume fraction of a crystal form of said β-form in said vinylidene fluoride resin is more than 60%.

13. An optical control device according to claim 11, wherein:
    the volume fraction of a crystal form of said β-form in said vinylidene fluoride resin is more than 70%.

14. An optical control device according to claim 11, wherein:
    the volume fraction of a crystal form of said β-form in said vinylidene fluoride resin is more than 80%.

15. An optical control device according to claim 11, wherein:
    said mixing ratio of the vinylidene fluoride resin to the methyl methacrylate resin is between about 70/30 and about 80/20.

16. An optical phase plate, usable as a λ-plate in an optical control device to prevent coloration of a display screen in a black and white liquid crystal display unit, comprising:
    an oriented film or sheet having a composition comprising a vinylidene fluoride resin and a methyl methacrylate resin in a mixing ratio of the former to the latter between about 65/35 and about 85/15 by weight, wherein
    the crystal structure of the vinylidene fluoride resin consists mainly of a β-form thereof and the film or sheet has dimensional stability with a final shrinkage of 3% or less and a retardation value R within a range from 500 to 650 nm, whereby a transmittance of at least 90% with a haze value of 0.3% or less is provided by the optical phase plate to incident light.

17. An optical phase plate according to claim 16, wherein:
    the volume fraction of a crystal form of said β-form in said vinylidene fluoride resin is more than 60%.

18. An optical phase plate according to claim 16, wherein:
    the volume fraction of a crystal form of said β-form in said vinylidene fluoride resin is more than 70%.

19. An optical phase plate according to claim 18, wherein:
    the volume fraction of a crystal form of said β-form in said vinylidene fluoride resin is more than 80%.

20. An optical phase plate according to claim 18, wherein:
    said mixing ratio of the vinylidene fluoride resin to the methyl methacrylate resin is between about 70/30 and about 80/20.

* * * * *